(12) United States Patent
Kim et al.

(10) Patent No.: US 10,349,253 B2
(45) Date of Patent: Jul. 9, 2019

(54) METHOD FOR TRANSMITTING AND RECEIVING DATA, AND DEVICE THEREFOR

(71) Applicant: LG ELECTRONICS INC., Seoul (KR)

(72) Inventors: Minjae Kim, Seoul (KR); Hokyun Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/753,535

(22) PCT Filed: Sep. 2, 2015

(86) PCT No.: PCT/KR2015/009262
§ 371 (c)(1),
(2) Date: Feb. 19, 2018

(87) PCT Pub. No.: WO2017/030232
PCT Pub. Date: Feb. 23, 2017

(65) Prior Publication Data
US 2018/0249310 A1    Aug. 30, 2018

(30) Foreign Application Priority Data
Aug. 19, 2015  (KR) .................. 10-2015-0116430

(51) Int. Cl.
*H04W 4/80*    (2018.01)
*H04W 8/00*    (2009.01)
(Continued)

(52) U.S. Cl.
CPC ............ *H04W 4/80* (2018.02); *H04W 8/005* (2013.01); *H04W 48/16* (2013.01); *H04W 52/02* (2013.01);
(Continued)

(58) Field of Classification Search
CPC ....... H04W 4/80; H04W 76/10; H04W 8/005; H04W 48/16; H04W 52/02; H04W 52/0209; H04W 56/001; H04W 88/02
See application file for complete search history.

(56) References Cited

U.S. PATENT DOCUMENTS 9,390,596 B1 * 7/2016 Todeschini .............. H04W 4/80

FOREIGN PATENT DOCUMENTS

KR    1020100045176    5/2010
KR    101536069    7/2015
(Continued)

OTHER PUBLICATIONS

PCT International Application No. PCT/KR2015/009262, International Search Report dated May 13, 2016, 3 pages.

*Primary Examiner* — Nguyen T Vo
(74) *Attorney, Agent, or Firm* — Lee, Hong, Degerman, Kang & Waimey

(57) ABSTRACT

A method for transmitting and receiving data between a first device and a second device using Bluetooth low energy (BLE) in a wireless communication system supporting Bluetooth communication is disclosed. A method performed by a first device comprises the steps of: storing synchronization data of a first device and a second device when a scan request of the second device and a scan response of the first device are made in response to the advertising of the first device; and resuming the advertising on the basis of the stored synchronization data when a connection between the first device and the second device is disconnected.

6 Claims, 22 Drawing Sheets

(51) Int. Cl.
*H04W 48/16* (2009.01)
*H04W 52/02* (2009.01)
*H04W 56/00* (2009.01)
*H04W 76/19* (2018.01)

(52) U.S. Cl.
CPC ..... *H04W 52/0209* (2013.01); *H04W 56/001* (2013.01); *H04W 76/19* (2018.02); *Y02D 70/122* (2018.01); *Y02D 70/14* (2018.01); *Y02D 70/144* (2018.01); *Y02D 70/20* (2018.01); *Y02D 70/26* (2018.01)

(56) References Cited

FOREIGN PATENT DOCUMENTS

| | | |
|---|---|---|
| WO | 2009156777 | 12/2009 |
| WO | 2014058223 | 4/2014 |
| WO | 2015069093 | 5/2015 |

\* cited by examiner

【Figure 1】
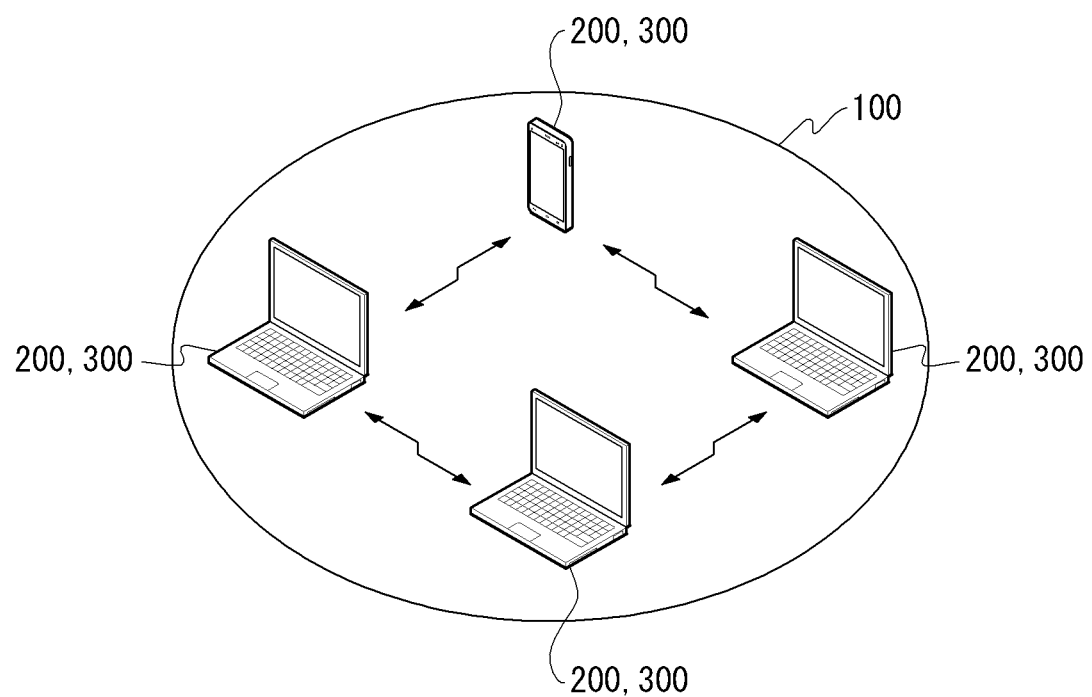

【Figure 2】
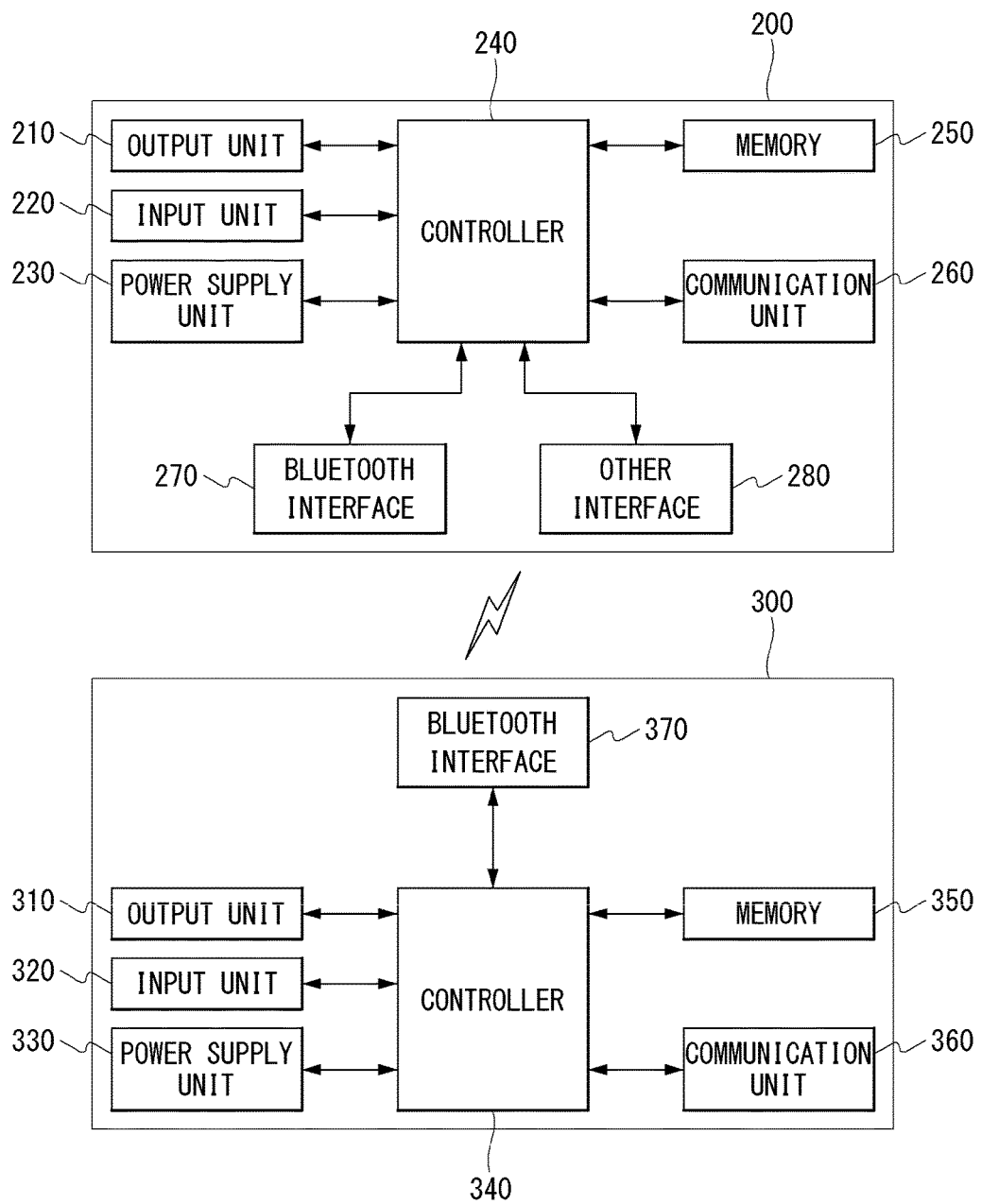

[Figure 3]
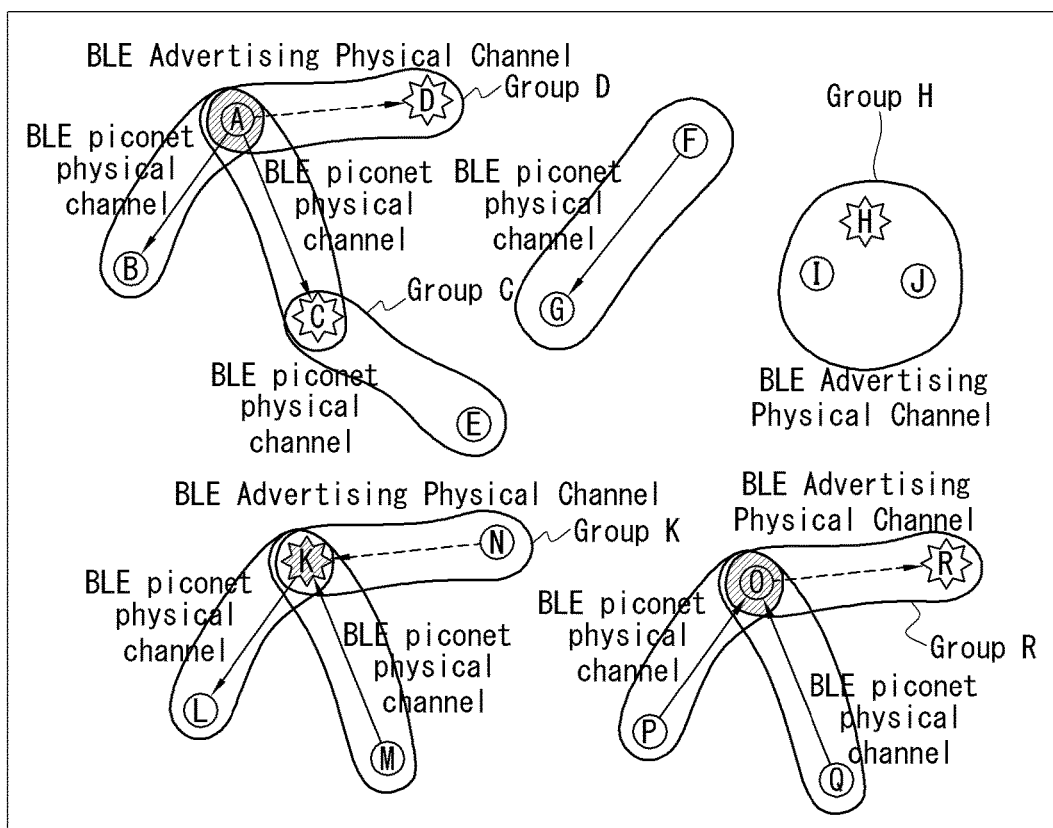

【Figure 4】
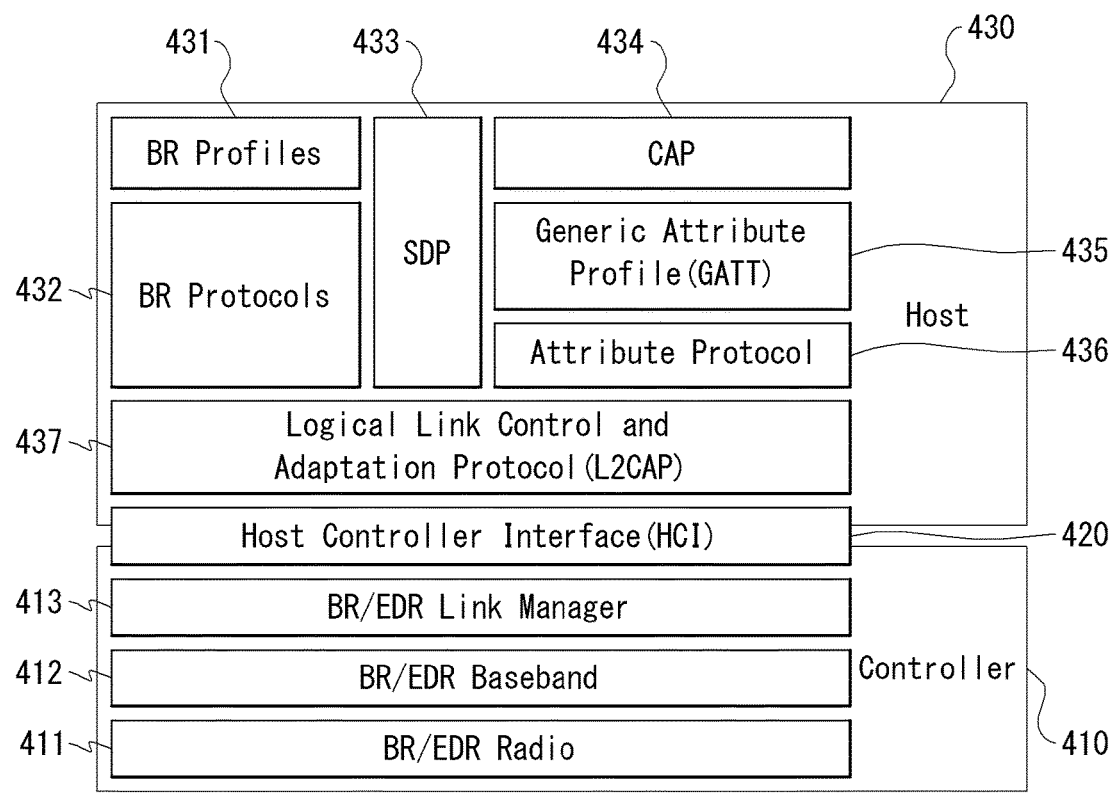

[Figure 5]
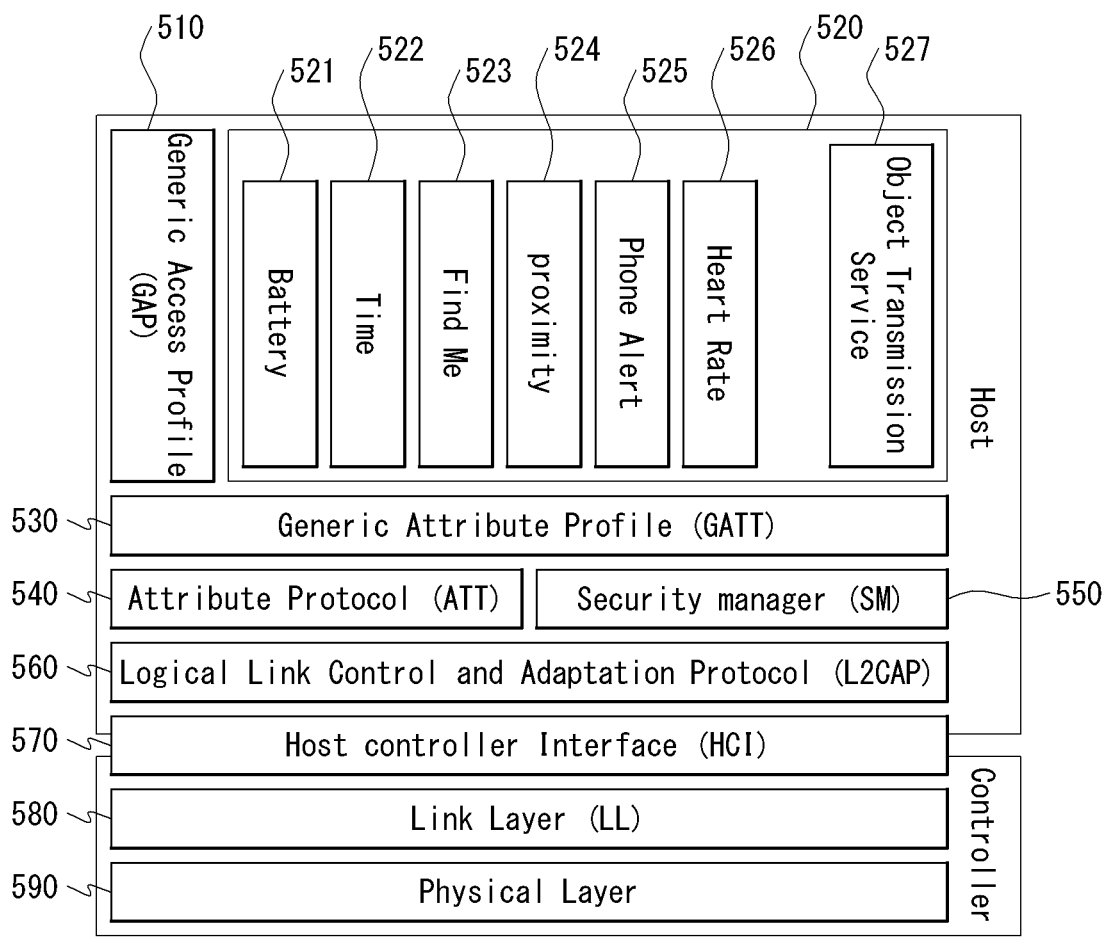

[Figure 6]
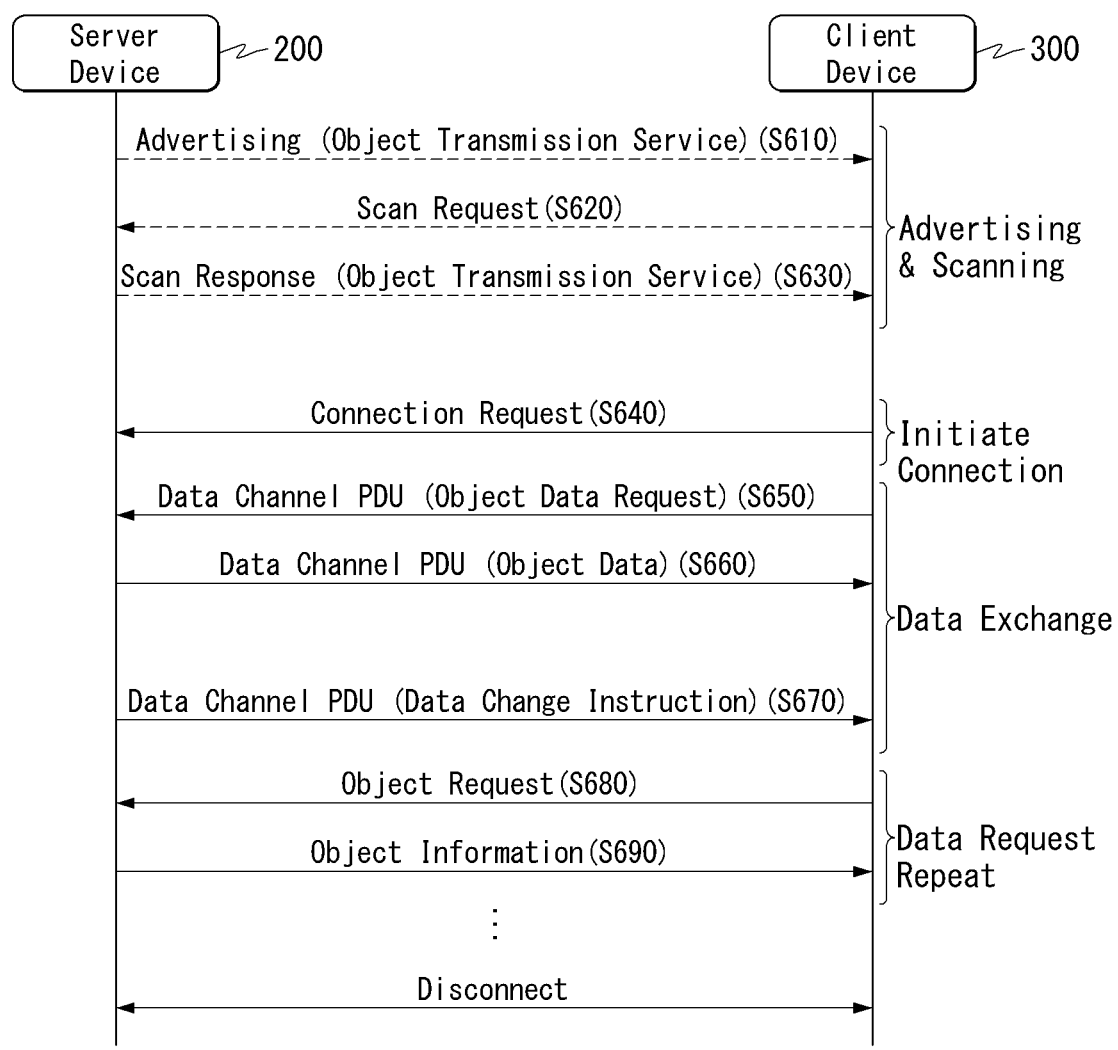

【Figure 7】
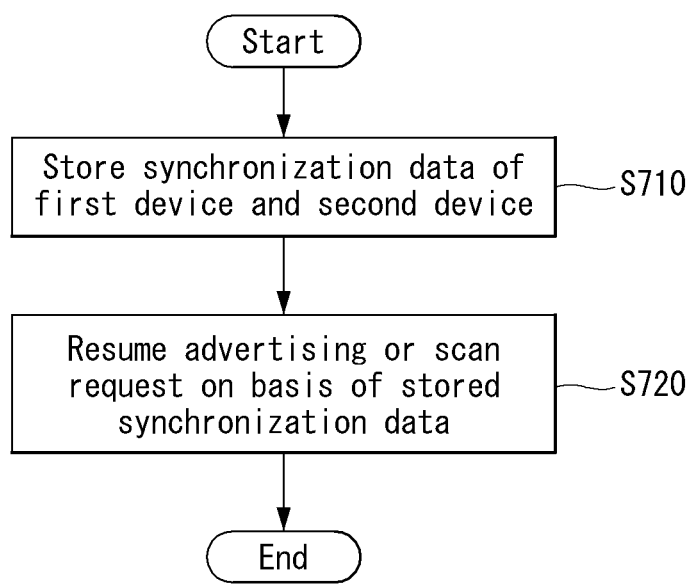

[Figure 8]
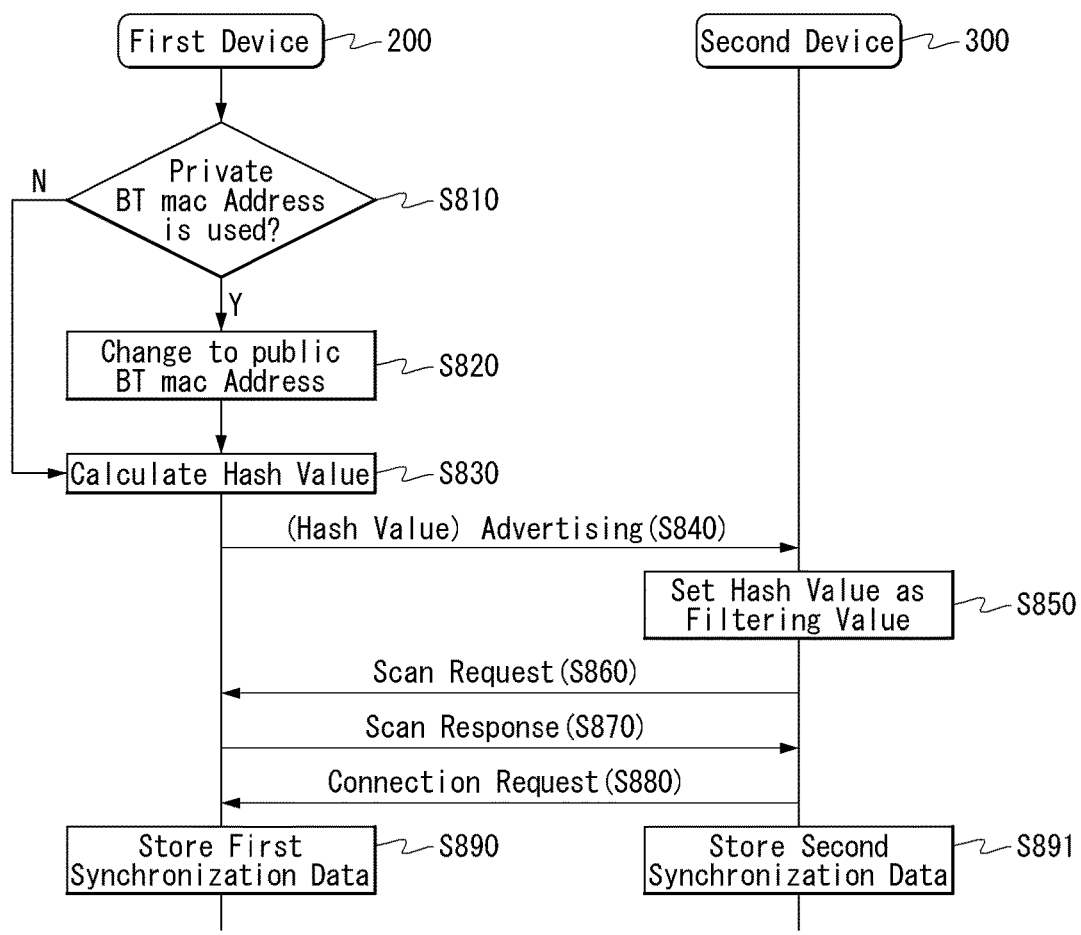

【Figure 9】
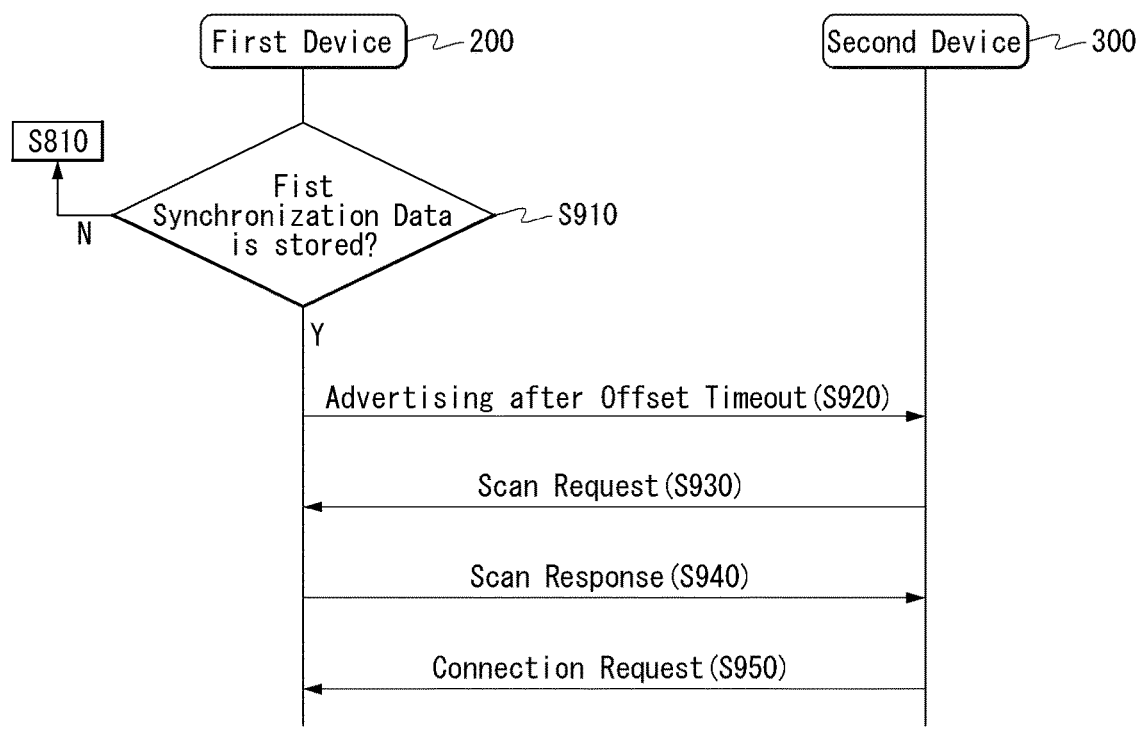

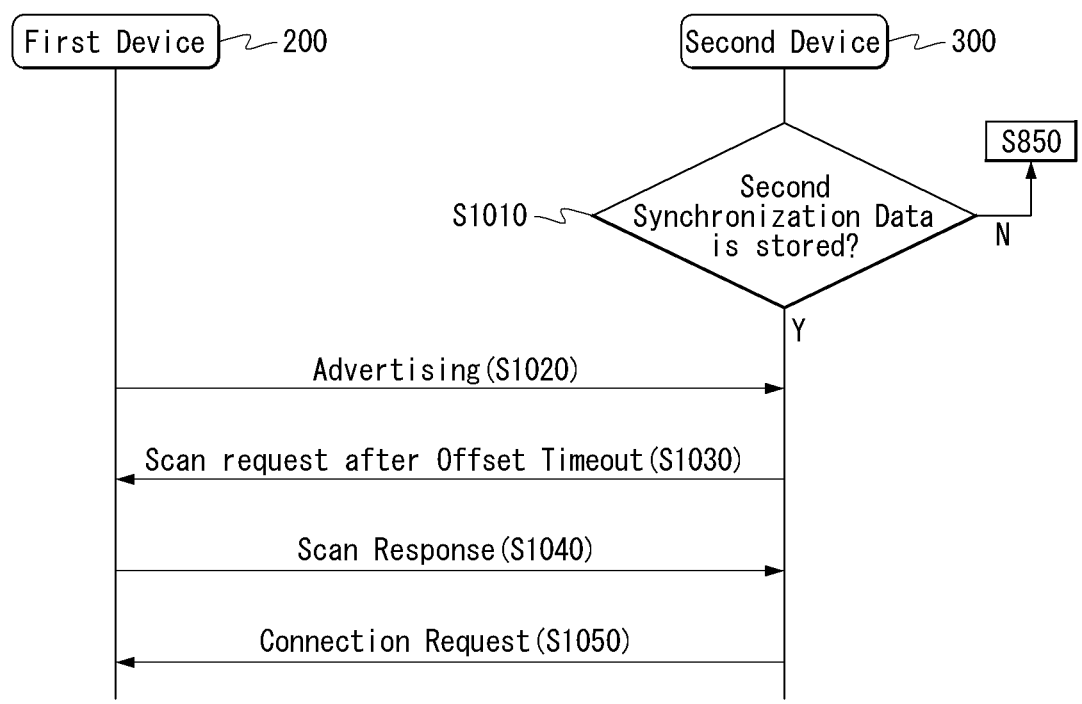
【Figure 10】

[Figure 11]
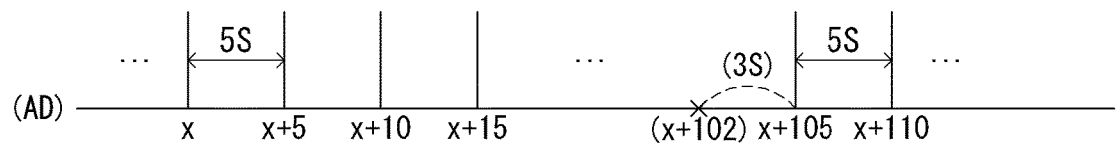

[Figure 12]
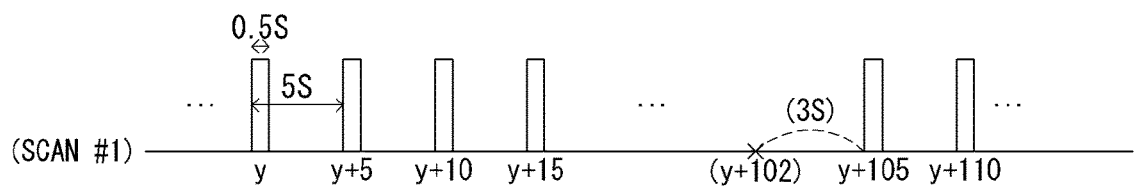

【Figure 13】
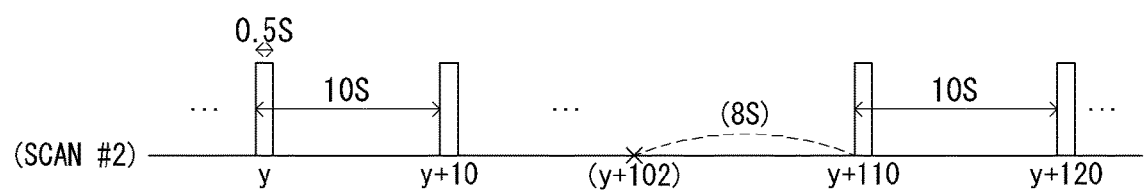

【Figure 14】
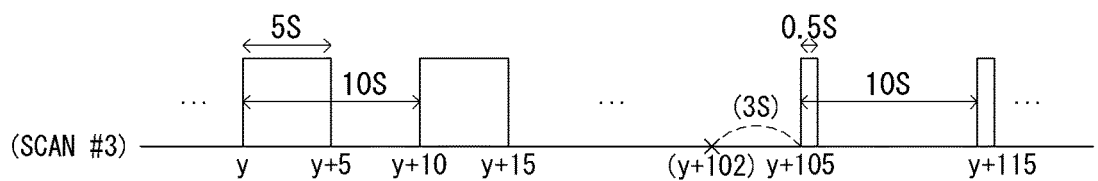

【Figure 15】
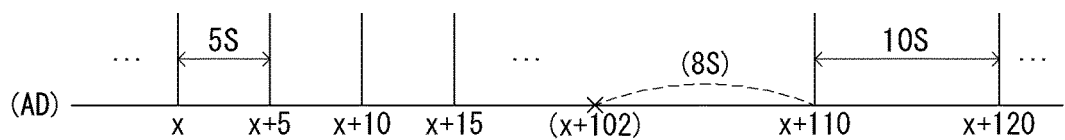

【Figure 16】
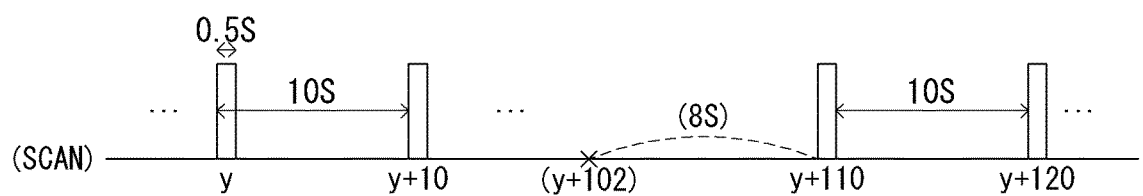

【Figure 17】
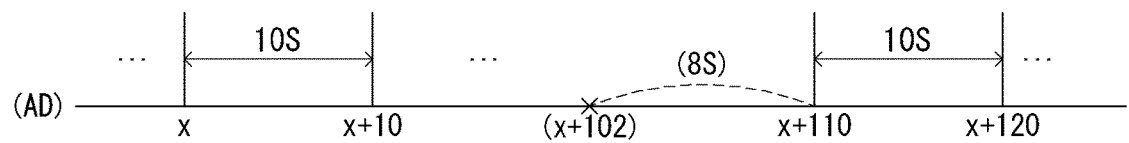

【Figure 18】
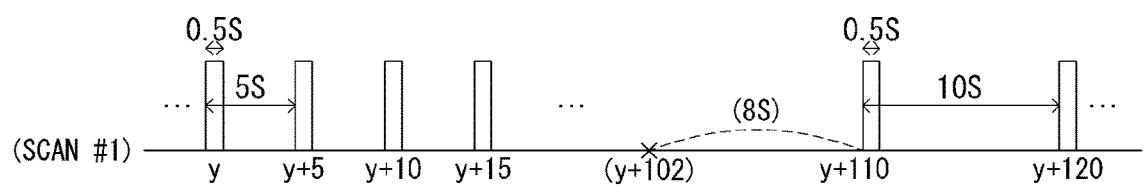

[Figure 19]
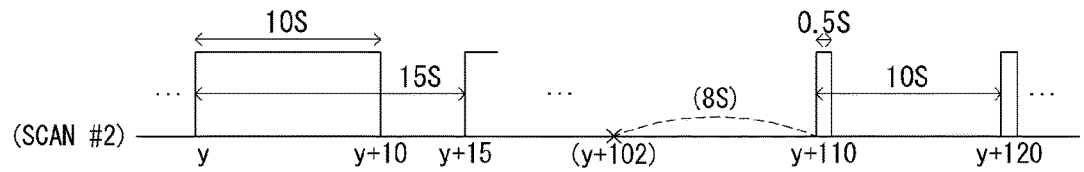

[Figure 20]
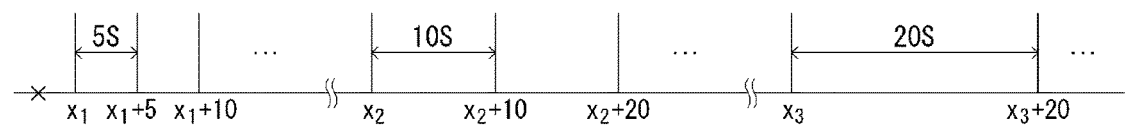

[Figure 21]
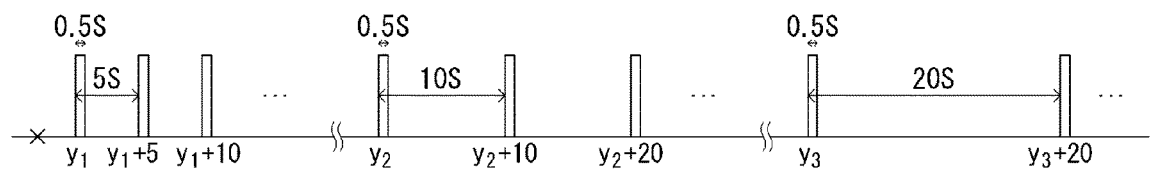

[Figure 22]
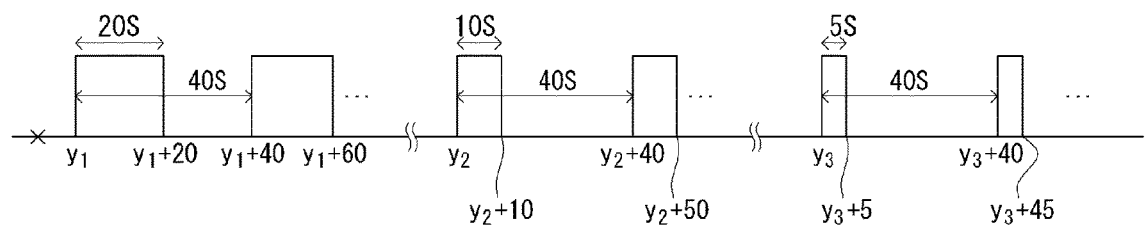

METHOD FOR TRANSMITTING AND RECEIVING DATA, AND DEVICE THEREFOR

CROSS-REFERENCE TO RELATED APPLICATIONS

This application is the National Stage filing under 35 U.S.C. 371 of International Application No. PCT/KR2015/009262, filed on Sep. 2, 2015, which claims the benefit of earlier filing date and right of priority to Korean Application No. 10-2015-0116430, filed on Aug. 19, 2015, the contents of which are all hereby incorporated by reference herein in their entirety.

TECHNICAL FIELD

The present invention relates to a wireless communication system supporting Bluetooth communication, and more particularly, to a method and apparatus for transmitting and receiving data using Bluetooth low energy in a wireless communication system supporting Bluetooth communication.

BACKGROUND ART

Bluetooth is one of the representative short-range wireless technologies that exchange information by connecting various devices (smartphone, PC, earphone, headphone, etc.). In addition, Bluetooth is a technology applied to most smart phones, PCs, laptops, etc., and is easily used by many people. And Bluetooth is technology providing stable inter-device connectivity by easy paring. The recently developed LE technology can reliably provide hundreds of KB of information while consuming less power.

Bluetooth standard technology distinguishes Core Specification from BR/EDR (Basic Rate/Enhanced Data Rate) and LE (Low Energy).

Among them, Bluetooth Low Energy (hereinafter referred to as 'BLE') is a technology announced since the Bluetooth Specification V4.0, which is designed to achieve high energy efficiency compared to conventional Bluetooth.

Meanwhile, in the process of searching between the first device and the second device using the BLE, the power of each device is often consumed. That is, the first device has to shorten the advertisement period for connection with the second device, the second device has to lengthen the scan window period for connection with the first device, or scan Interval period should be shortened.

In such a case, since the first and second devices consume a large amount of power in order to perform their respective searches, a method for improving the same is sought.

DISCLOSURE

Technical Problem

The present invention is in accordance with the above-mentioned need. An object of the present invention is to provide a method of transmitting and receiving data for resuming the advertising or scan using synchronous data of the first device or the second device when the connection between the first device and the second device using Bluetooth Low Energy is disconnected.

Technical Solution

A method of transmitting and receiving data between a first device and a second device using Bluetooth low energy (BLE) in a wireless communication system supporting Bluetooth communication, the method performed by the first device may comprise storing synchronization data of the first device and the second device when a scan request of the second device and a scan response of the first device are made in response to an advertising of the first device; and resuming the advertising based on the stored the synchronization data when the connection between the first device and the second device is disconnected.

The method may further comprise extracting a hash value of the first device; and advertising the extracted hash value to the second device.

The extracting the hash value may comprise changing a private BT mac address to a public BT mac address when the first device uses the private BT mac address; and extracting the hash value using the changed private BT mac address.

The first device and the second device may be a Smart Watch and a Smart Phone, respectively.

The resuming the advertising may comprise advertising the extracted hash value to the second device based on the stored synchronization data.

The synchronization data includes at least one of a time and a period of the advertising of the first device or a time and a period of the scan of the second device.

In another aspect of the present invention, a method of transmitting and receiving data between a first device and a second device using Bluetooth low energy (BLE) in a wireless communication system supporting Bluetooth communication, the method performed by the second device may comprise storing synchronization data of the first device and the second device when a scan request of the second device and a scan response of the first device are made in response to an advertising of the first device; and resuming the scan request based on the stored the synchronization data when the connection between the first device and the second device is disconnected.

The method may further comprise receiving a hash value of the first device; and requesting the scan by filtering the first device as the received hash value.

The first device and the second device are a Smart Watch and a Smart Phone, respectively.

The resuming the scan request comprises requesting the scan about the received hash value to the first device based on the stored synchronization data.

The synchronization data includes at least one of a time and a period of the advertising of the first device or a time and a period of the scan of the second device.

In another aspect of the present invention, a device, for transmitting and receiving data using Bluetooth low energy (BLE) in a wireless communication system supporting Bluetooth communication, may comprise a memory; a communication unit for communicating with other device; and a controller configured to operatively connect to the communication unit, wherein the controller may be configured to store, in the memory, synchronization data of the device and the other device when a scan request of the other device and a scan response of the device are made in response to an advertising of the device; and resume the advertising based on the stored the synchronization data when the connection between the device and the other device is disconnected.

In another aspect of the present invention, a device, for transmitting and receiving data using Bluetooth low energy (BLE) in a wireless communication system supporting Bluetooth communication, may comprise a memory; a communication unit for communicating with other device; and a controller configured to operatively connect to the communication unit, wherein the controller may be configured to store, in the memory, synchronization data of the device and the other device when a scan request of the device and a scan response of the other device are made in response to an advertising of the other device; and resume the scan request based on the stored the synchronization data when the connection between the device and the other device is disconnected.

Advantageous Effects

According to at least one embodiment of the present invention, the advertisement period of the first device is lengthened, and the power consumption of the first device is reduced.

In addition, according to at least one embodiment of the present invention, the scan window period of the second device is shortened or the scan interval period is long, so that power consumption of the second device is reduced.

Further scope of applicability of the present invention will become apparent from the following detailed description. It should be understood, however, that the detailed description and specific examples, such as the preferred embodiment of the invention, are given by way of illustration only, since various changes and modifications within the spirit and scope of the invention will be apparent to those skilled in the art.

BRIEF DESCRIPTION OF THE DRAWINGS

FIG. 1 is a schematic diagram showing an example of a wireless communication system using the Bluetooth low energy technology proposed in the present specification.

FIG. 2 is an example of an internal block diagram of a server device and a client device capable of implementing the methods proposed herein.

FIG. 3 is an example of a Bluetooth low energy topology.

FIGS. 4 to 5 are an example of a Bluetooth communication architecture to which the methods proposed herein can be applied.

FIG. 6 is an example of a flow chart of a method for providing object transmission services in Bluetooth low energy technology.

FIG. 7 is a flowchart illustrating a method of transmitting and receiving data according to an embodiment of the present invention.

FIG. 8 is a flowchart illustrating a method of storing synchronization data according to an embodiment of the present invention.

FIGS. 9 to 10 are flowcharts illustrating a Bluetooth connection according to a method of transmitting and receiving data according to an embodiment of the present invention.

FIGS. 11 to 22 are various examples of drawings for explaining a method of advertising and scanning according to an embodiment of the present invention.

MODE FOR INVENTION

Description will now be given in detail according to exemplary embodiments disclosed herein, with reference to the accompanying drawings.

In general, a suffix such as "module" and "unit" may be used to refer to elements or components. Use of such a suffix herein is merely intended to facilitate description of the specification, and "module and" unit may be used interchangeably.

Meanwhile, the device described in the present specification is a device capable of wireless communication, and can be a mobile phone including a smart phone, a tablet PC, a desktop computer, a notebook, a smart TV, a television including an IPTV, and the like.

In the following, embodiments of the present invention will be described in detail with reference to the accompanying drawings and accompanying drawings, but the present invention is not limited to or limited by the embodiments.

As used herein, terms used in the present invention are selected from general terms that are widely used in the present invention while taking into account the functions of the present invention, but these may vary depending on the intentions or customs of the person skilled in the art or the emergence of new technologies.

Also, in certain cases, there may be a term arbitrarily selected by the applicant, in which case the meaning thereof will be described in the description of the corresponding invention.

Therefore, it is to be understood that the term used herein should be understood not simple name of the term but based on the substantive meaning of the term and its explanation throughout the specification.

FIG. 1 is a schematic diagram showing an example of a wireless communication system using the Bluetooth low energy technology proposed in the present specification.

The wireless communication system 100 includes at least one server device 200 and at least one client device 300.

The server device 200 and the client device 300 perform Bluetooth communication using Bluetooth low energy (BLE) technology.

First, the BLE technology has a relatively small duty cycle and can be manufactured at a low price compared to the Bluetooth BR/EDR (Basic Rate/Enhanced Data Rate) technology, and the power consumption can be greatly reduced through the low data rate, When using a coin cell battery, it can operate for more than one year.

In addition, BLE technology simplifies the connection procedure between devices and packet size is designed smaller than Bluetooth BR/EDR technology.

In BLE technology, (1) the number of RF channels is 40, (2) the data rate is 1 Mbps, (3) the topology is the star structure, (4) the latency is 3 ms, (5) maximum current is 15 mA or less, (6) output power is less than 10 mW (10 dBm), and (7) it is mainly used in applications such as mobile phones, watches, sports, health care, sensors and device control.

The server device 200 may operate as a client device 300 in relation to another device and the client device 300 may operate as a server device 200 in relation to another device. That is, in the BLE communication system, any one of the devices can operate as the server device 200 or the client device 300, and if necessary, can operate simultaneously as the server device 200 and the client device 300.

The server device 200 includes a data service device, a master device, a master, a server, a conductor, a host device, an audio source device and first device, and the client device 300 may be a slave device, a slave, a client device, a member, a sink device, an audio sink device and second device, or the like.

The server device 200 and the client device 300 correspond to major components of the wireless communication system and the wireless communication system may include other components in addition to the server device 200 and the client device 300.

The server device 200 refers to a device that provides data to the client device 300 in response of receiving a data request from the client device 300 by receiving data from the client and communicating directly with the client device 300.

The server device 200 also sends a Notification message and an Indication message to the client device 300 in order to provide the client device 300 with the data information. Also, when the server device 200 transmits an instruction message to the client device 300, the server device 200 receives a confirmation message corresponding to the instruction message from the client.

The server device 200 may provide data information to a user via an output unit in a process of transmitting and receiving notifications, instructions, and confirmation messages to/from the client device 300, or may receive request to be input from a user via user input interface.

In addition, the server device 200 can read data from a memory unit or write new data into a corresponding memory in a process of transmitting and receiving a message to and from the client device 300.

Also, one server device 200 can be connected to a plurality of client devices 300, and can easily reconnect (or connect) with the client devices 300 using bonding information.

The client device 300 refers to a device that requests data information and data transmission to the server device 200.

The client device 300 receives data from the server device 200 through a notification message or an instruction message and sends a confirmation message in response to the instruction message when receiving the instruction message from the server device 200.

The client device 300 can also provide information to the user through the output unit or receive input from the user through the input unit during transmitting and receiving of messages with the server device 200.

In addition, the client device 300 can read data from the memory or write new data to the memory in the course of transmitting and receiving a message with the server device 200.

Hardware components such as the output unit, the input unit, and the memory of the server device 200 and the client device 300 will be described in detail with reference to FIG. 2.

In addition, the wireless communication system can configure a personal area networking (PAN) through Bluetooth technology. For example, in a wireless communication system, it is possible to quickly and safely exchange files, documents, etc. by establishing a private piconet between devices.

The BLE device (or apparatus) may be operable to support various Bluetooth-related protocols, profiles, processes, and the like.

FIG. 2 is an example of an internal block diagram of a server device and a client device capable of implementing the methods proposed herein.

The server device 200 may be connected to at least one client device 300.

In addition, the internal block diagram of each device may further include other components (module, block, unit) as necessary, and some of the components of FIG. 2 may be omitted.

As depicted in FIG. 2, the server device 200 includes a output unit (Display Unit) 210, a input unit (User Input interface) 220, a power supply unit 230, a controller (Processor) 240, a memory unit 250, a communication unit 260, a Bluetooth interface 270, and other interface 280.

The output unit 210, the input unit 220, the power supply unit 230, the controller 240, the memory 250, the communication unit 260, the Bluetooth interface 270 and the otehr interface 280 are functionally linked to carry out the method.

The client device 300 includes a output unit (Display Unit) 310, a input unit (User Input interface) 320, a power supply unit 330, a controller (processor) 340, a memory unit 350, a communication unit (transmitting and receiving unit) 360, and a Bluetooth interface 370.

The output unit 310, the input unit 320, the power supply unit 330, the controller 340, the memory 350, the communication unit 360, and the Bluetooth interface 370 are functionally linked to carry out the method respectively.

The Bluetooth interfaces 270, 370 are, using Bluetooth technology, unit (or module) capable of transmitting and receiving of request/response, command, notification, indication/confirmation messages or data between the devices.

The memories 250, 350 are units implemented in various kinds of devices, and each unit stores various types of data.

The controller 240, 340 is a module for controlling the overall operation of the server device 200 or the client device 300. The controller is configured to be requesting the message transmission or processing the received message through the Bluetooth interface 270, 370 and other nterface 280.

The controller 240, 340 may be represented by a processor, a control unit, and the like.

The controller 240, 340 may include an application-specific integrated circuit (ASIC), another chipset, a logic circuit, and/or a data processing device.

The memory 250, 350 may include read-only memory (ROM), random access memory (RAM), flash memory, memory cards, storage media, and/or other storage devices.

The communication unit 260, 360 may include a baseband circuit for processing a radio signal. When the embodiment is implemented in software, the above-described techniques may be implemented with modules (processes, functions, and so on) that perform the functions described above. The module is stored in the memory 250, 350, and can be executed by the controller 240, 340.

The memory 250, 350 may be internal or external to the controller 240, 340 and may be connected to the controller 240, 340 through various well known means.

The output unit 210, 310 is module for providing status information and message exchange information of a device to a user through a screen.

The power supply unit 230, 330 is module that receive external power and internal power under the control of the controller 240, 340 and supply power necessary for operation of the respective components.

As you have seen, BLE technology has a small duty cycle and can significantly reduce power consumption through a low data rate, so that the power supply can supply the power required for operation of each component with low output power (less than 10 mW (10 dBm)).

The input unit 220, 320 is a module that allows the user to control the operation of the device by providing the user's input to the controller as a screen button.

FIG. 3 is an example of a Bluetooth low energy topology.

Referring to FIG. 3, device A corresponds to a master in a piconet (piconet A, shaded area) having device B and device C as slaves.

Here, a piconet is a set of devices occupying a shared physical channel in which one of a plurality of devices is a master and the remaining devices are connected to a master device.

The BLE slave does not share a common physical channel with the master. Each slave communicates with the master via a separate physical channel. There is another piconet (piconet F) having a master device F and a slave device G.

Device K is on a scatternet K. Here, the scatternet refers to a group of piconets in which a connection exists between other piconets.

The device K is the master of the device L and the slave of the device M.

Device O is also on the scatternet O. Device O is a slave of device P and slave of device Q.

As shown in FIG. 3, there are five different device groups.

Device D is an advertiser, and device A is an initiator. (Group D)

Device E is a scanner, and device C is an advertiser. (Group C)

Device H is the advertiser, and devices I and J are the scanners. (Group H)

Device K is also an advertiser, and device N is an initiator. (Group K)

Device R is an advertiser and device O is an initiator. (Group R)

Devices A and B use one BLE piconet physical channel.

Devices A and C use another BLE piconet physical channel.

In group D, device D advertises using advertising events connectable on advertising physical channels, and device A is an initiator. Device A may establish a connection with device D, and may add a device to piconet A.

In group C, device C advertises on the advertising physical channel using some type of advertising event captured by scanner device E.

Group D and Group C may use different advertising physical channels or use different times to avoid collisions.

The piconet F has one physical channel. Devices F and G use one BLE piconet physical channel. Device F is the master, and device G is the slave.

Group H has one physical channel. Devices H, I, and J use one BLE advertising physical channel. Device H is the advertiser, and devices I and J are the scanners.

In scatternet K, devices K and L use one BLE piconet physical channel. Devices K and M use another BLE piconet physical channel.

In group K, device K advertises using adertising events that are connectable on advertising physical channels, and device N is an initiator. Device N can form a connection with device K. Here, the device K becomes a slave of two devices and becomes a master of one device at the same time.

In Scatternet O, devices O and P use one BLE piconet physical channel. Devices O and Q use another BLE piconet physical channel.

In group R, device R advertises using advertising events that are connectable on the advertising physical channel, and device O is the initiator. Device O can form a connection with device R. Here, the device O becomes a slave of the two devices and becomes a master of one device at the same time.

FIGS. 4 to 5 are an example of a Bluetooth communication architecture to which the methods proposed herein can be applied.

Specifically, FIG. 4 illustrates an example of an architecture of Bluetooth BR (Basic Rate)/EDR (Enhanced Data Rate), and FIG. 5 illustrates an example of an architecture of Bluetooth LE (Low Energy).

First, as shown in FIG. 4, the Bluetooth BR/EDR architecture includes controller stack 410, host controller interface 420, and host stack 430.

The controller stack (or controller module 410) refers to a wireless transmit/receive module that receives a 2.4 GHz Bluetooth signal and hardware for transmitting or receiving Bluetooth packets. The controller stack may include a BR/EDR Radio layer 411, a BR/EDR Baseband layer 412, and a BR/EDR Link Manager layer 413.

The BR/EDR radio layer 411 is a layer for transmitting and receiving a 2.4 GHz radio signal, and can transmit data by hopping 79 RF channels when GFSK (Gaussian Frequency Shift Keying) modulation is used.

The BR/EDR baseband layer 412 transmits a digital signal, selects a channel sequence for hopping 1600 times per second, and transmits a time slot of 625 us length for each channel.

The Link Manager layer 413 controls the overall operation (link setup, control, security) of the Bluetooth connection by using the LMP (Link Manager Protocol).

The Link Manager layer can perform the following functions.

ACL/SCO logical transport and logical link setup and control.

Detach: Aborts the connection and informs the partner device of the reason for the interruption.

Power control and Role switch.

Perform security (authentication, pairing, encryption) function.

The host controller interface layer 420 provides an interface between the host module 430 and the controller module 410 so that the host provides commands and data to the controller and the controller 410 provides events and data to the host It will help.

The host stack (or host module) 430 may include L2CAP 437, Service Discovery Protocol 433, BR/EDR Protocol 432, BR/EDR Profiles 431, Attribute Protocol 436, GAP (Generic Access Profile) 434, and GATT (Generic Attribute Profile) 435.

The Logical Link Control and Adaptation Protocol (L2CAP) 437 provides a bi-directional channel for transmitting data to a specific protocol or profile.

The L2CAP 437 multiplexes various protocols, profiles, and the like provided by the Bluetooth upper layer.

L2CAP of Bluetooth BR/EDR uses dynamic channel, supports protocol service multiplexer, retransmission, streaming mode, and provides segmentation and reassembly, per-channel flow control and error control.

SDP (Service Discovery Protocol) 433 is a protocol for searching for a service (Profile and Protocol) supported by a Bluetooth device.

The BR/EDR Protocol and Profiles 432, 431 define a service using Bluetooth BR/EDR and application protocols for sending and receiving these data.

The Attribute Protocol 436 is a Server-Client structure, which defines rules for accessing data of a partner device. There are six types of messages (Request message, Response message, Command message, Notification message, Indication message).

Request message from client to server with response message from server to client Command message from client to server without response message Notification message from server to client without Confirm message Indication message from server to client with Confirm message from client to server Generic Attribute Profile (GATT) 435 defines the type of attribute.

The Generic Access Profile (GAP) 434 defines device discovery, connection, and means of providing information to the user and provides privacy.

As shown in FIG. 5, the BLE architecture includes a controller stack operable to process timing-critical radio device interfaces and a host stack operable to process high level data.

The controller stack may be referred to as a controller. In order to avoid confusion with the controller or the processor, which is an internal component of the device mentioned in FIG. 2, the controller stack is hereinafter referred to as a Controller stack.

First, the controller stack may be implemented using a communication module, which may include a Bluetooth wireless device, and a processor module, which may include a processing device such as, for example, a microprocessor.

The host stack may be implemented as part of an operating system running on a processor module, or as an instantiation of a package on the OS.

In some instances, the controller stack and host stack may operate or run on the same processing device within the processor module.

The host stack includes GAP (Generic Access Profile) 510, GATT based Profiles 520, GATT (Generic Attribute Profile) 530, ATT (Attribute Profile) 540, SM (Security Manager) 550, L2CAP (Logical Link Control and Adaptation Protocol) 560. However, the host stack is not limited to this, and may include various protocols and profiles.

The host stack uses L2CAP to multiplex various protocols and profiles provided by the Bluetooth host.

First, the L2CAP (Logical Link Control and Adaptation Protocol) 560 provides one bi-directional channel for transmitting data to a specific protocol or profile.

The L2CAP may be operable to multiplex data between higher layer protocols, segment and reassemble the packages, and manage multicast data transmissions.

BLE uses three fixed channels (one for the signaling CH, one for the Security Manager, and one for the Attribute protocol).

On the other hand, BR/EDR (Basic Rate/Enhanced Data Rate) uses a dynamic channel, and supports protocol service multiplexer, retransmission, and streaming mode.

SM (Security Manager) 550 is a protocol for authenticating a device and providing key distribution.

ATT (Attribute Protocol) 540 defines a rule for accessing data of a partner device in a server-client structure. ATT has six message types (Request, Response, Command, Notification, Indication, Confirmation).

That is, ① Request and Response Message: The Request message is a message for requesting specific information from the client device to the server device, and the Response message is a response message to the Request message, which is a message transmitted from the server device to the client device.

② Command message: A message transmitted from a client device to a server device in order to instruct a specific operation command. The server device does not transmit a response for the command message to the client device.

③ Notification message: A message transmitted from the server device to the client device for notification such as an event, and the client device does not transmit a confirmation message for the notification message to the server device.

④ Indication and Confirm message: A message transmitted from the server device to the client device for notification such as an event. Unlike the Notification message, the client device transmits a confirmation message for the Indication message to the server device.

GAP (Generic Access Profile, 510) is a newly implemented layer for BLE technology. GAP is used to Select of roles for communication between BLE devices, and control how multi-profile behavior occurs.

The GAP 510 is mainly used in device discovery, connection generation, and security procedures, defines a method for providing information to a user, and defines the following types of attributes.

① Service: Define the basic operation of device by combination of data related behavior.

② Include: Defines the relationship between services

③ Characteristics: Data value used in service

④ Behavior: Computer-readable format defined by UUID (Universal Unique Identifier, value type)

The GATT-based Profiles (520) are GATT-dependent profiles and are mainly applied to BLE devices. GATT-based Profiles can be Battery, Time, FindMe, Proximity, Time, Object Delivery Service, and so on. The concrete contents of GATT-based Profiles are as follows.

Battery: How to exchange battery information

Time: How to exchange time information

FindMe: Provides distance-based alarm service

Proximity: How to exchange battery information

Time: How to exchange time information

The GATT may be operable as a protocol that describes how an ATT is used in constructing services. For example, the GATT may be operable to define how ATT attributes are grouped together into services and be operable to describe features associated with the services.

Thus, the GATT and ATT describe the state and services of the device, and use the features to explain how the features are related to one another and how they are used.

The controller stack includes a physical layer 590, a link layer 580, and a host controller interface 570.

The physical layer (radio transmitting and receiving module) 590 is a layer for transmitting and receiving a 2.4 GHz radio signal, and uses a frequency hopping scheme consisting of GFSK (Gaussian Frequency Shift Keying) modulation and 40 RF channels.

The link layer 580 transmits or receives Bluetooth packets.

In addition, the link layer 580 performs a function of advertising and scanning using three advertisement channels, and then creates a connection between devices and provides a function of exchanging data packets of up to 42 bytes through 37 data channels.

HCI (Host Controller Interface) 570 provides an interface between the Host stack and the Controller stack, providing commands and data from the Host stack to the Controller stack, and providing events and data from the Controller stack to the Host stack.

Hereinafter, procedures of the Bluetooth low energy (BLE) technology will be briefly described.

The BLE procedure can be divided into a device filtering procedure, an advertising procedure, a scanning procedure, a discovery procedure, and a connecting procedure.

Device Filtering Procedure

The device filtering procedure is a method for reducing the number of devices that respond to requests, instructions, notifications, etc., in the controller stack.

Since it is unnecessary to respond to requests on all devices, the controller stack can reduce the number of requests sent and control the power consumption in the BLE controller stack.

The advertising device or the scanning device may perform the device filtering procedure to restrict the device receiving the advertisement packet, the scan request or the connection request.

Here, the advertising device refers to a device that transmits an advertisement event, that is, performs an advertisement, and is also referred to as an advertiser.

The scanning device refers to a device that performs scanning, and a device that transmits a scan request.

In the BLE, if the scanning device receives some advertising packets from the advertising device, the scanning device must send a scan request to the advertising device.

However, if the device filtering procedure is used and scan request transmission is unnecessary, the scanning device may ignore the advertising packets transmitted from the advertisement device.

The device filtering procedure can also be used in the connection request process. If device filtering is used in the connection request process, it is unnecessary to send a response to the connection request by ignoring the connection request.

Advertising Procedure

The advertisement device performs an advertisement procedure to perform a nondirectional broadcast to the devices in the area.

Here, the nondirectional broadcast refers to a broadcast in all directions other than a broadcast in a specific direction.

In contrast, a directional broadcast refers to broadcast in a particular direction. The nondirectional broadcast occurs without a connection procedure between the advertising device and a device in a listening state (hereinafter referred to as a listening device).

The advertising procedure is used to establish a Bluetooth connection with a nearby initiating device.

Alternatively, the advertising procedure may be used to provide a periodic broadcast of user data to the scanning devices that are listening on the advertising channel.

In the advertising process, all advertisements (or advertising events) are broadcast via the advertising physical channel.

The advertising devices may receive a scan request from the listening devices that are listening to obtain additional user data from the advertising device. The advertising device transmits a response for the scan request to the device that transmitted the scan request via the same advertising physical channel as the advertising physical channel received the scan request.

Broadcast user data sent as part of advertising packets is dynamic data, while scan response data is generally static data.

The advertising device may receive a connection request from an initiating device on an advertising (broadcast) physical channel. If the advertising device uses the connectable advertising event and the initiating device has not been filtered by the device filtering procedure, the advertising device stops the advertising and enters the connected mode. The advertising device may start the advertising again after the connection mode.

Scanning Procedure

A device that performs scanning, i.e., a scanning device, performs a scanning procedure to listen to a nondirectional broadcast of user data from advertising devices using the advertising physical channel.

The scanning device transmits a scan request to the advertisement device via the advertising physical channel to request additional user data from the advertising device. The advertising device transmits a scan response, which is a response to the scan request, including the additional user data requested by the scanning device via the advertising physical channel.

The scanning procedure can be used while connecting to other BLE devices in the BLE piconet.

If the scanning device receives an advertising event to be broadcast and is in the initiator mode in which the connection request can be initiated, the scanning device transmits a connection request to the advertising device via the advertising physical channel, and start a Bluetooth connection.

When the scanning device sends a connection request to the advertising device, the scanning device stops the initiator mode scanning for further broadcasting and enters the connection mode.

Discovering Procedure

A device capable of Bluetooth communication (hereinafter, referred to as a 'Bluetooth device') performs an advertising procedure and a scanning procedure to discover nearby devices or to be discovered by other devices in a given area.

The discovering procedure is performed asymmetrically. A Bluetooth device that is trying to find other devices around is called a discovering device and listens for devices that advertise a scanable advertising event. A Bluetooth device that is found and available from another device is called a discoverable device and broadcasts an advertising event so that another device can actively scan via the advertising (broadcast) physical channel.

Both the discovering device and the discoverable device may already be connected to other Bluetooth devices in the piconet.

Connecting Procedure

The connecting procedure is asymmetric and the connecting procedure requires that other Bluetooth devices perform scanning procedures while a particular Bluetooth device performs the advertising procedure.

That is, the advertising procedure may be the purpose, and as a result, only one device will respond to the advertising. After receiving the connectable advertising event from the advertising device, it can initiate the connection by sending a connection request to the advertising device via the advertising (brocastcast) physical channel.

Next, an operation state in the BLE technology, that is, an advertisement state, a scanning state, an initiating state, and a connection state will be briefly described.

Advertising State

The link layer LL enters the advertising state by the instruction of the host (stack). When the link layer is in the advertising state, the link layer transmits advertising PDU (PACKET Data Unit) in the advertising events.

Each advertising event is composed of at least one advertising PDUs, and the advertising PDUs are transmitted via the used advertising channel indexes. The advertising event may be terminated when the advertising PDU is transmitted via each of the advertising channel indexes used, or may be terminated earlier if the advertising device needs to secure space for performing other functions.

Scanning State

The link layer enters the scanning state by the instruction of the host (stack). In the scanning state, the link layer listens for the advertising channel indexes.

There are two types of scanning states: passive scanning and active scanning. Each scanning type is determined by the host.

No separate time or channel index is defined for scanning.

During the scanning state, the link layer listens for the advertising channel index during the scan window duration. The scan interval is defined as the interval between the start points of two successive scan windows.

If there is no conflict of scheduling, the link layer must listen for completion of all scan intervals of the scan window as indicated by the host. In each scan window, the link layer must scan the other advertising channel indexes. The link layer uses all available advertising channel indexes.

At passive scanning, the link layer only receives packets and does not transmit any packets.

At active scanning, the link layer performs listening to rely on the advertising PDU type that can request additional information related to the advertising PDU and the advertising device to the advertising device.

Initiating State

The link layer enters the initiating state by the instruction of the host (stack).

When the link layer is in the initiation state, the link layer performs listening to the advertisement channel indexes.

During the initiation state, the link layer listens for the advertising channel index during the scan window section.

Connection State

The link layer enters the connection state when the device performing the connection request, i.e., the initiating device sends a CONNECT_REQ PDU to the advertising device, or when the advertising device receives the CONNECT_REQ PDU from the initiating device.

After entering the connection state, the connection is considered to be created. However, it does not need to be considered to be established at the time the connection enters the connection state. The only difference between the newly created connection and the previously established connection is the link layer supervision timeout value.

When two devices are connected, the two devices act in different roles.

The link layer that performs a master role is called the master, and the link layer that acts as a slave is called the slave. The master controls the timing of the connection event, and the connection event refers to the time at which the master and the slave are synchronized.

Hereinafter, a packet defined in the Bluetooth interface will be briefly described. BLE devices use the packets defined below.

Packet Format

The link layer has only one packet format used for both the advertising channel packet and the data channel packet.

Each packet consists of four fields: a preamble, an access address, a PDU, and a CRC.

When one packet is transmitted on the advertising physical channel, the PDU will be an advertising channel PDU, and when one packet is transmitted on the data physical channel, the PDU will be a data channel PDU.

Advertising Channel PDU

The advertising channel PDU (Packet Data Unit) has a 16-bit header and payloads of various sizes.

The PDU type field of the advertising channel PDU included in the header indicates the PDU type as defined in Table 1 below.

TABLE 1

| PDU Type | PACKet Name |
| --- | --- |
| 0000 | ADV-IND |
| 0001 | ADV_DIRECT_IND |
| 0010 | ADV-NONCONN-IND |
| 0011 | SCAN_REQ |
| 0100 | SCAN-RSP |
| 0101 | CONNECT-REQ |
| 0110 | ADV-SCAN-IND |
| 0111-1111 | Reserved |

Advertising PDU

The following advertising channel PDU types are called advertising PDUs and are used in specific events.

ADV_IND: connectable nondirectional advertising event

ADV_DIRECT_IND: connectable directional advertising event

ADV_NONCONN_IND: unconnectable nondirectional advertising event

ADV_SCAN_IND: Scannable nondirectional advertising event

PDUs are transmitted in the link layer in the advertising state and received by the link layer in the scanning state or the initiating state.

Scanning PDUs

The following advertising channel PDU type is called a scanning PDU and is used in a state described below.

SCAN_REQ: transmitted by the link layer in the scanning state, and received by the link layer in the advertising state.

SCAN_RSP: transmitted by the link layer in the advertising state, and received by the link layer in the scanning state.

Initiating PDUs

The following advertising channel PDU type is referred to as a initiating PDU.

CONNECT_REQ: transmitted by the link layer in the initiating state, and received by the link layer in the advertising state.

Data Channel PDU

The data channel PDU may have a 16-bit header, payloads of various sizes, and may include a Message Integrity Check (MIC) field.

The procedures, states, packet formats, and the like in the BLE technology discussed above can be applied to perform the methods proposed in this specification.

FIG. 6 is an example of a flow chart of a method for providing object transmission services in Bluetooth low energy technology.

Object Delivery Service is a service supported by the BLE to send or receive objects or data such as bulk data in Bluetooth communication.

An advertising process and a scanning process corresponding to the steps S610 to S630 are performed to establish a Bluetooth connection between a server device 200 and a client device 300.

First, the server device 200 transmits an advertising message to the client device 300 to inform the server device related information including the object transmission service (S610).

The advertising message may be represented by an advertising PDU (Packet Data Unit), an advertising packet, an advertising, an advertising frame, an advertising physical channel PDU, and the like.

The advertising message may include service information (including a service name) provided by the server device 200, a name of a server device, manufacturer data, and the like.

In addition, the advertising message may be transmitted to the client device 300 in a broadcasting scheme or a unicast scheme.

Then, the client device 300 transmits a Scan Request message to the server device 200 in order to know more detailed information related to the server device 200 (S620).

The scan request message may be expressed as a scanning PDU, a scan request PDU, a scan request, a scan request frame, a scan request packet, or the like.

Thereafter, the server device 200 transmits a Scan Response message to the client device 300 in response to the scan request message received from the client device 300 (S630).

The scan response message includes information related the server device requested by the client device 300. Here, information related the server device may be an object or data that can be transmitted from the server device 200 in connection with the provision of the object transmission service.

When the advertising process and the scanning process are terminated, the server device 200 and the client device 300 perform an initiating connection process and a data exchange process corresponding to steps S640 to S670.

Specifically, the client device 300 transmits a connect request message to the server device 200 for Bluetooth communication with the server device 200 (S640).

The connect request message can be represented by a connection request PDU, an initiation PDU, a connection request frame, a connection request, and the like.

In step S640, a Bluetooth connection is established between the server device 200 and the client device 300, and then the server device 200 and the client device 300 exchange data. During the data exchange, data can be transmitted/received via the data channel PDU.

The client device 300 transmits an object data request to the server device 200 via a data channel PDU (S650). The data channel PDU may be represented by a data request message, a data request frame, or the like.

Thereafter, the server device 200 transmits the object data requested by the client device 300 to the client device 300 via the data channel PDU (S660).

Here, the data channel PDU is used to provide data to the partner device or request data information in a manner defined by the attribute protocol.

Thereafter, when a change of data occurs in the server device 200, the server device 200 transmits data changed indication information via the data channel PDU to the client device 300 to notify the change of the data or the object (S670).

Thereafter, the client device 300 requests the changed object information to the server device 200 to find the changed data or the changed object (S680).

Thereafter, the server device 200 transmits the changed object information from the server device 200 to the client device 300 in response to the changed object information request (S690).

Then, the client device 300 searches for the changed object by comparing and analyzing the received changed object information with the object information of the current client device 300.

However, the client device 300 repeatedly performs steps S680 to S690 until it finds the changed object or data.

Thereafter, when the connection state between the host device and the client device 300 does not need to be maintained, the host device or the client device 300 may disconnect the connection state.

FIG. 7 is a flowchart illustrating a method of transmitting and receiving data according to an embodiment of the present invention. Hereinafter, a description overlapping with the above description will be omitted.

Referring to FIG. 7, a method of transmitting and receiving data between a first device 200 and a second device 300 using Bluetooth low energy (BLE) in a wireless communication system supporting Bluetooth communication is disclosed. Hereinafter, the first device 200 and the second device 300 may be a Smart Watch and a Smart Phone, respectively, but vice versa. Also, the first device 200 may be various devices used in the Internet of Things (IoT), and in this case, the second device 300 may be a smart watch or a smart phone.

An advertising process and a scanning process are performed to establish a Bluetooth connection between the first device 200 and the second device 300.

First, the first device 200 may transmit an advertising message to the second device 300.

The second device 300 may then transmit a scan request message to the first device 200. In this case, the first device 200 may store the synchronization data (S710).

The synchronization data stored in the first device 200 may mean the time when the second device 300 requests the scan request message for the advertising of the first device 200. Specifically, the synchronization data of the first device 200 may mean period information, reception time information, etc. like of the signal transmitted by the second device 300 to the first device 200 in response to the advertising.

The first device 200 may then transmit the scan response message to the second device 300. In this case, the second device 300 may store the synchronization data (S710).

The synchronization data stored in the second device 300 may mean the time when the first device 200 requested the scan response message for the scan request of the second device 300. Specifically, the synchronization data of the second device 300 may mean period information, reception time information, etc. of the signal transmitted from the first device 200 to the second device 300 in response to the scan request.

A specific process of storing the synchronization data will be described with reference to FIG. 8.

The connection between the first device 200 and the second device 300 may then be disconnected. Specifically, it may mean that the distance between the first device 200 and the second device 300 is out of the range where the Bluetooth communication is possible.

In this case, the first device 200 or the second device 300 may resume the advertising or scanning based on the stored synchronization data (S720).

Specifically, when the connection between the first device 200 and the second device 300 is disconnected, the first device 200 may resume advertising based on the stored synchronization data, and the second device 300 may resume the scan request based on the stored synchronization data. A method of resuming advertising based on the stored synchronization data will be described with reference to FIG. 9, and a method of resuming scanning based on stored synchronization data will be described with reference to FIG. 10.

FIG. 8 is a flowchart illustrating a method of storing synchronization data according to an embodiment of the present invention. The process of storing synchronization data will be described with reference to FIG. 8.

First, the first device 200 may determine whether a private BT mac address is used (S810). Accordingly, if it is determined that the address used by the first device 200 is not the private BT mac address (S810_N), the first device 200 can directly extract the hash value (S830). Where the BT mac address is a media access control address in Bluetooth networking, which may be a number that behaves like an identifier of a particular network adapter.

However, if it is determined that the address used in the first device 200 is the private BT mac address (S810_Y), the first device 200 can not directly extract the hash value, the address should be converted into a public BT mac address (S820). Accordingly, the first device 200 can extract the hash value from the converted public BT mac address from the private BT mac address (S830). The method for converting the public BT mac address from the private BT mac address and the method for extracting the hash value from the public BT mac address are well known and will not be described in detail.

Meanwhile, the first device 200 can advertise the extracted hash value to the second device 300 (S840).

Thereafter, the second device 300 may set the advertised hash value as a filtering value (S850). The second device 300 sets the hash value to the filtering value so that when the scanning is resumed after the first device 200 and the second device 300 are disconnected, It becomes possible to scan the device that is advertising the corresponding hash value.

If the second device 300 transmits a scan request message to the first device 200 in operation S860 and the first device 200 transmits a scan response message to the second device 300 in operation S870, a connection may be established between the first device 200 and the second device 300 (S880).

When the first device 200 and the second device 300 are connected as described above, the first device 200 stores the first synchronization data (S890), and the second device 300 stores the second synchronization data can be stored (S891).

In FIG. 7, when the scan request message of the second device 300 is transmitted for the advertising of the first device 200, the first device 200 stores the first synchronization data. However, when the first device 200 and the second device 300 are adjacent to each other, the scan response corresponding to the advertising and the scan response corresponding to the scan request can be made at the same time. Accordingly, it may have the same meaning as storing the first synchronization data in the first device when the connection is established between the first device 200 and the second devices 300. This can be equally applied to the case where the second device 300 stores the second synchronization data.

Meanwhile, the first synchronization data may include at least one of time and a period of the advertising of the first device 200. Likewise, the second synchronization data may include at least one of time and a period of the scanning of the second device 300.

Specifically, the first synchronization data stored in the first device 200 may mean period information and reception time information, etc. of the signal transmitted from the second device 300 to the first device 200 in correspondence with the advertising of the first device 200. Likewise, the second synchronization data stored in the second device 300 may mean period information and reception time information, etc. of the signal transmitted from the first device 200 to the second device 300 in response to the scan request of the second device 300.

For example, It is assumed that the advertising time of the first device 200 is x1, and the advertising period of the first device 200 is y1. It is also assumed that the scanning time of the second device 300 over the advertising of the first device 200 is x2 and the scanning period over the advertising of the first device 200 is y2.

In this case, x1 and x2 may be the same or different. Specifically, the scan request corresponding to the advertising and the scan response corresponding to the scan request can be made at the same time as described above. Therefore, when the first device 200 and the second device 300 are driven by the same operating system, x1 and x2 may be the same. On the contrary, when the first device 200 and the second device 300 are driven by different operating systems, x1 and x2 may be different.

Further, if the scan request time of the second device 300 corresponding to the advertising of the first device 200 is x1 (sec) and the advertising period is 5 (sec), the first device 200 may store them as the first synchronization data.

Similarly, if the scan response time of the first device 200 corresponding to the scan request of the second device 300 is y1 (sec) and the scan period is 5 (sec), the second device 300 may store them as the second synchronization data.

The first and second synchronous data may be used at the time of reconnection after the first device 200 and the second device 300 are disconnected. This will be described in detail with reference to FIG. 11 to FIG. 22

In FIG. 8, the process of storing the respective synchronization data in the process of first connecting the first device 200 and the second device 300 has been described. Hereinafter, a process of reconnecting the first device 200 and the second device 300 when they are disconnected will be described.

FIGS. 9 to 10 are flowcharts illustrating a Bluetooth connection according to a method of transmitting and receiving data according to an embodiment of the present invention. Hereinafter, a process of resuming the first device 200 and the second device 300 when they are disconnected will be described. Further, a description overlapping with the above description will be omitted.

Referring to FIG. 9, when the first device 200 and the second device 300 are disconnected, the first device 200 may determine whether the first synchronization data is stored (S910).

If it is determined that the first synchronization data is not stored (S910_N), the first device 200 may perform step S810 of FIG. 8. However, if it is determined that the first synchronization data is stored (S910_Y), the first device 200 can resume the advertising by retransmitting the advertising message to the second device 300 (S920).

In this case, the first device 200 may perform the advertising for the second device 300 after the offset time has elapsed based on the first synchronization data. That is, the first device 200 can perform the advertising at a time when the second device 300 can scan in consideration of the current time and the advertising period.

For example, it is assumed that the first synchronization data is stored that the scan request time of the second device 300 according to the advertising of the first device 200 is x1 (sec), and the advertising period is 5 seconds. In this case, if reconnection is attempted after the first device 200 and the second device 300 are disconnected, the advertising can be performed based on the stored first synchronization data. For example, if the current time is x1+102 (sec), since the advertising period is 5 seconds, advertising can be made at a time of x1+105 (sec), which is 3 seconds after the current time.

Meanwhile, the first device 200 may advertise the extracted hash value to the second device 300 based on the stored synchronization data. The second device 300 sets the hash value as the filtering value before the first device 200 and the second device 300 are disconnected as described above. Accordingly, when the first device 200 and the second device 300 are disconnected and reconnected, the first device 200 may advertise the hash value to the second device 300 so that the second device 300 may be able to scan the first device 200 that is advertising the hash value corresponding to the set filtering value.

If the second device 300 transmits a scan request message to the first device 200 (S930), the first device 200 transmits a scan response message to the second device 300 (S940). A reconnection between the first device 200 and the second device 300 may be made (S950).

The description of the operation of the first device 200 with respect to the reconnection can be similarly applied to the second device 300 as well.

Referring to FIG. 10, when the connection between the first device 200 and the second device 300 is disconnected, the second device 300 can determine whether the second synchronization data is stored (S1010).

If it is determined that the second synchronization data is not stored (S1010_N), the first device 200 can perform the step S850 of FIG. 8. On the contrary, if it is determined that the second synchronization data is stored (S1010_Y), the second device 300 may retransmit the scan request message on the advertising (S1020) of the first device 200 (S1030).

In this case, the second device 300 may request a scan to the first device 200 after the offset time has elapsed based on the second synchronization data. That is, the second device 300 can request a scan at a time when the scan response of the first device 200 is possible, considering the current time and the scan period.

For example, it is assumed that the second synchronization data is stored that the scan response time of the first device 200 according to the scan request of the second device 300 is y1 (sec), and the scan period is 5 seconds. In this case, if reconnection is attempted after the first device 200 and the second device 300 are disconnected, the scan request can be performed based on the stored second synchronization data. For example, if the current time is y1+102 (sec), since the scan request period is 5 seconds, the scan request can be made at a time of y1+105 (sec), which is 3 seconds after the current time.

If the first device 200 transmits a scan response message to the second device 300 (S1040), a reconnection between the first device 200 and the second device 300 may be made (S950).

FIGS. 11 to 22 are various examples of drawings for explaining a method of advertising and scanning according to an embodiment of the present invention. Hereinafter, a case where resume between the first device 200 and the second device 300 is performed based on the synchronization data will be described with specific examples.

In FIG. 11, a description will be given of a method in which the first device 200 resume the advertising based on the first synchronization data. Referring to FIG. 11, it is assumed that the first synchronization data includes an advertising period, and the advertising period is stored as 5 seconds. If the first device 200 and the second device 300 are disconnected at a time corresponding to x+102 (sec), since the advertising period is 5 seconds, the first device 200 may resume the advertising since the time corresponding to x+105 (sec), which is 3 seconds after the connection is disconnected.

This is the same for the scan request of the second device 300. In FIGS. 12 to 14, a method of resuming a scan request by the second device 300 with respect to the advertising of the first device 200 shown in FIG. 11 will be described.

Referring to FIG. 12, the second synchronization data includes a scan window (scan window width or scan window period) and a scan interval (scan period or scan interval period), and the scan window is stored as 0.5 second and the scan interval is stored as 5 seconds. Comparing to FIGS. 11 and 12, the time corresponding to x (sec) in which the advertising of the first device 200 is performed is included in the time corresponding to the scan window of the second device 300. Further, the advertising interval and scan interval are the same as 5 seconds.

If the connection between the first device 200 and the second device 300 is disconnected at a time corresponding to y+102 (sec), the second device 300 should request a scan after 3 seconds from the connection is disconnected. Accordingly, the second device 300 can resume the scan request since the time corresponding to y+105 (sec). In this case, the scan window before and after reconnection of the first device 200 and the second device 300 may be equal to 0.5 seconds.

Similarly, referring to FIG. 13, it is assumed that the scan interval included in the second synchronization data is stored as 10 seconds. Comparing to FIGS. 11 and 13, the time corresponding to x (sec) for the advertising of the first device 200 is included in the time corresponding to the scan window of the second device 300. The advertising interval is 5 seconds and scan interval is 10 seconds If the connection between the first device 200 and the second device 300 is disconnected at a time corresponding to y+102 (sec), the second device 300 should request a scan after 8 seconds from the connection is disconnected. Accordingly, the second device 300 can resume the scan request since the time corresponding to y+110 (sec). In this case, the scan window before and after reconnection of the first device 200 and the second device 300 may be equal to 0.5 seconds.

Meanwhile, FIG. 14 shows a case where the scan interval is ten times as long as that of FIG. 13. In this case, if the second device 300 requests the scan after 3 seconds from the connection between the first device 200 and the second device 300 are disconnected, can receive a scan response from the first device 200. That is, the second device can resume the scan request since the time corresponding to y+105 (sec).

Here, the second device 300 does not need to keep the scan window at 5 seconds. That is, even if the scan window is reduced to 0.5 seconds, the scan response can be received from the first device 200 if the scan request is made at the time corresponding to y+105 (sec). Therefore, as shown in FIG. 14, the second device 300 can reduce the scan window. Further, the second synchronization data is updated, and the scan window and the scan interval can be stored as 0.5 second and 10 seconds, respectively. As a result, the scan window of the second device 300 is shortened so that the power consumption of the second device 300 is reduced.

Meanwhile, a case in which the advertising period becomes longer in FIGS. 15 to 16 will be described.

Referring to FIG. 15, it is assumed that the first synchronization data includes an advertising period, and the advertising period is stored as 5 seconds. Referring to FIG. 16, it is assumed that the scan window and the scan interval included in the second synchronization data are stored in 0.5 second and 10 seconds, respectively. Comparing to FIGS. 15 and 16, the time corresponding to x (sec) for the advertising of the first device 200 is included in the time corresponding to the scan window of the second device 300, and the period performed the scan response is 10 seconds.

If the connection between the first device 200 and the second device 300 is disconnected at a time corresponding to x+102 (sec) and y+102 (sec) respectively, the first device 200 can resume the advertising since x+110 (sec), which is 8 seconds after the connection is disconnected, and the second device 300 can resume the scan request since y+110 (sec), which is 8 seconds after the connection is disconnected.

Here, the first device 200 does not need to keep the advertising period as 5 seconds. That is, even if the advertising period is increased to 10 seconds, the scan request can be received from the second device 300 if the advertising is performed at a time corresponding to x+105 (sec). Therefore, as shown in FIG. 15, the first device 200 can increase the advertising period. Further, the first synchronization data is updated, and the advertising period can be stored as 10 seconds. Thus, the advertising period of the first device 200 is increased so that the power consumption of the first device 200 is reduced.

Meanwhile, in FIGS. 17 to 19, a case where the scan window or the scan interval is changed will be described.

First, FIG. 17 and FIG. 18 are compared. As shown in FIG. 17, the advertising period included in the first synchronization data is stored as 10 seconds. As shown in FIG. 18, the scan window and the scan interval included in the second synchronization data are 0.5 second and 10 seconds respectively. The time corresponding to x (sec) in which the advertising of the first device 200 is performed is included in the time corresponding to the scan window of the second device 300. And, period corresponding to the scan response is performed is 10 seconds If the connection between the first device 200 and the second device 300 is disconnected at a time corresponding to x+102 (sec) and y+102 (sec) respectively, the first device 200 can resume the advertising since x+110 (sec), which is 8 seconds after the connection is disconnected, and the second device 300 can resume the scan request since y+110 (sec), which is 8 seconds after the connection is disconnected.

Here, the second device 300 does not need to keep the scan interval as 5 seconds. That is, even if the scan interval is increased to 10 seconds, the scan response can be received from the first device 200 if the scan request is performed at a time corresponding to y+105 (sec). Therefore, as shown in FIG. 18, the second device 300 can increase the scan interval. Further, the second synchronization data is updated, and the scan interval can be stored as 10 seconds. Thus, the scan interval of the second device 300 is increased so that the power consumption of the second device 300 is reduced.

Similarly, FIG. 17 and FIG. 19 are compared. As shown in FIG. 17, the advertising period included in the first synchronization data is stored as 10 seconds. As shown in FIG. 19, the scan window and the scan interval included in the second synchronization data are 10 second and 15 seconds respectively. The time corresponding to x (sec) in which the advertising of the first device 200 is performed is included in the time corresponding to the scan window of the second device 300. And, period corresponding to the scan response is performed is 10 seconds If the connection between the first device 200 and the second device 300 is disconnected at a time corresponding to x+102 (sec) and y+102 (sec) respectively, the first device 200 can resume the advertising since x+110 (sec), which is 8 seconds after the connection is disconnected, and the second device 300 can resume the scan request since y+110 (sec), which is 8 seconds after the connection is disconnected.

Here, the second device 300 does not need to keep the scan window and the scan interval as 10 seconds and 15 seconds respectively. That is, even if the scan window and the scan interval is increased to 0.5 second and 10 seconds respectively, the scan response can be received from the first device 200 if the scan request is performed at a time corresponding to y+110 (sec). Therefore, as shown in FIG. 19, the second device 300 can shorten the scan window and the scan interval. Further, the second synchronization data is updated, and the scan window and the scan interval can be stored as 0.5 second and 10 seconds respectively.

In the above, the case where the reconnection is performed once is described, but the present invention is not limited thereto. Therefore, a case where reconnection is performed several times will be described in FIG. 20 to FIG. 22. Hereinafter, the description of the parts overlapping with the above description will be omitted.

As shown in FIG. 20, the first device 200 may perform the advertising at intervals of 5 seconds. Thereafter, the connection with the second device 300 is disconnected, and a first reconnection is performed. In this case, the advertising period of the first device 200 may be increased to 10 seconds. Therefore, the first synchronization data can be updated and stored as 10 seconds, which is the increased advertising period. Thereafter, the connection with the second device 300 is disconnected once again, and a second reconnection is made. In this case, the advertising period of the first device 200 may be increased to 20 seconds. Therefore, the first synchronization data can be updated and stored as 20 seconds, which is the increased advertising period.

As shown in FIG. 21, the second device 300 may request the scan with the scan interval of 5 seconds. Thereafter, the connection with the first device 200 is disconnected and a first reconnection is performed. In this case, the scan interval of the second device 300 may be increased to 10 seconds. Therefore, the second synchronization data can be updated and stored as 10 seconds, which is the increased the scan interval. Then, the connection with the second device 300 is disconnected once again, and a second reconnection is performed. In this case, the scan interval of the second device 300 may be increased to 20 seconds. Therefore, the second synchronization data can be updated and stored as 20 seconds, which is the increased the scan interval.

As shown in FIG. 22, the second device 300 may request the scan with the scan interval of 20 seconds. Thereafter, the connection with the first device 200 is disconnected and a first reconnection is performed. In this case, the scan window of the second device 300 may be shortened to 10 seconds. Therefore, the second synchronization data can be updated and stored as 10 seconds, which is the shortened the scan window. Then, the connection with the second device 300 is disconnected once again, and a second reconnection is performed. In this case, the scan window of the second device 300 may be shortened to 5 seconds. Therefore, the second synchronization data can be updated and stored as 5 seconds, which is the shortened the scan window.

Further, for convenience of explanation, the drawings have been separately described, it is also possible to design a new embodiment to be implemented by merging the embodiments described in each drawing. It is also within the scope of the present invention to design a computer-readable medium in which a program for executing the previously described embodiments is recorded according to the needs of those skilled in the art.

The method of transmitting and receiving data using Bluetooth low power energy according to the present invention is not limited to the configuration and method of the embodiments described above, may be constructed by selectively or in combination.

Further, the method of transmitting and receiving data using the Bluetooth low energy of the present invention can be implemented as a processor-readable code on a processor-readable medium included in a network device. Examples of the processor-readable mediums include ROM, RAM, CD-ROM, a magnetic tape, a floppy disk, an optical data storage device, the other types of storage mediums presented herein, and combinations thereof. If desired, the processor-readable medium may be realized in the form of a carrier wave (for example, a transmission over the Internet). In addition, the processor-readable medium may be distributed over network-connected computer systems so that code readable by the processor in a distributed fashion can be stored and executed.

While the present invention has been particularly shown and described with reference to exemplary embodiments thereof, it is to be understood that the invention is not limited to the disclosed exemplary embodiments. It will be understood that various modifications may be made by those skilled in the art. These modifications should not be understood individually from the technical idea or prospect of the present invention.

In this specification, both the invention of the device and the invention of the method are described, and the description of the two inventions can be supplemented each other as necessary.

The invention claimed is:

1. A method of transmitting and receiving data between a first device and a second device using Bluetooth low energy (BLE) in a wireless communication system supporting Bluetooth communication, the method performed by the first device comprising:
   storing synchronization data of the first device and the second device when a scan request of the second device and a scan response of the first device are made in response to an advertising of the first device; and
   resuming the advertising based on the stored synchronization data when the first device and the second device stop communicating with each other,
   wherein the synchronization data of the first device comprise period information and reception time information of a signal transmitted by the second device to the first device in response to the advertising, and
   wherein the synchronization data of the second device comprise period information and reception time information of a signal transmitted from the first device to the second device in response to the scan request.

2. The method of claim 1, further comprising:
   extracting a hash value of the first device; and
   advertising the extracted hash value to the second device.

3. The method of claim 2,
   wherein the extracting the hash value comprises changing a private BT mac address to a public BT mac address when the first device uses the private BT mac address; and extracting the hash value using the changed private BT mac address.

4. The method of claim 2,
   wherein the resuming the advertising comprises advertising the extracted hash value to the second device based on the stored synchronization data.

5. The method of claim 1,
   wherein the first device and the second device are a Smart Watch and a Smart Phone, respectively.

6. A device for transmitting and receiving data using Bluetooth low energy (BLE) in a wireless communication system supporting Bluetooth communication, the device comprising:
   a memory;
   a communication unit for communicating with other device; and
   a controller configured to:
      operatively connect to the communication unit;
      store, in the memory, synchronization data of the device and the other device when a scan request of the other device and a scan response of the device are made in response to an advertising of the device; and
      resume the advertising based on the stored the synchronization data when the device and the other device stop communicating with each other,
   wherein the synchronization data of the device comprise period information and reception time information of a signal transmitted by the other device to the device in response to the advertising, and
   wherein the synchronization data of the other device comprise period information and reception time information of a signal transmitted from the device to the other device in response to the scan request.

* * * * *